(12) United States Patent
Yi

(10) Patent No.: US 11,386,533 B2
(45) Date of Patent: Jul. 12, 2022

(54) IMAGE PROCESSING METHOD AND RELATED DEVICE

(71) Applicant: Shenzhen Intellifusion Technologies Co., Ltd., Guangdong (CN)

(72) Inventor: Liqiang Yi, Guangdong (CN)

(73) Assignee: Shenzhen Intellifusion Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/468,709

(22) Filed: Sep. 8, 2021

(65) Prior Publication Data
US 2022/0122237 A1 Apr. 21, 2022

(30) Foreign Application Priority Data
Oct. 16, 2020 (CN) .......................... 202011106093.8

(51) Int. Cl.
*G06T 5/30* (2006.01)
*G06T 7/62* (2017.01)
*G06T 5/50* (2006.01)

(52) U.S. Cl.
CPC .................. *G06T 5/30* (2013.01); *G06T 5/50* (2013.01); *G06T 7/62* (2017.01)

(58) Field of Classification Search
CPC .... G06T 5/30; G06T 5/50; G06T 7/62; G06T 3/4046; G06T 9/002; G06T 2207/20084;
(Continued)

(56) References Cited

U.S. PATENT DOCUMENTS 9,836,853 B1 * 12/2017 Medioni ................. G06T 7/246
2021/0279841 A1 * 9/2021 Liu ............................ G06K 9/46
(Continued)

FOREIGN PATENT DOCUMENTS

CN 111311599 A 6/2020

*Primary Examiner* — Jose L Couso

(57) ABSTRACT

An image processing method includes: grouping input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers; performing a convolution calculation on the $D_h \times D_w$ grouped image data respectively by a first convolution kernel, to obtain $D_h \times D_w$ grouped convolution calculation results; wherein the first convolution kernel is a convolution kernel before the dilation convolution is dilated; and obtaining a dilation convolution calculation result of the input image data according to the $D_h \times D_w$ grouped convolution calculation results. The present disclosure can reduce power consumption, improve efficiency of the dilation convolution calculation.

5 Claims, 14 Drawing Sheets

Grouping input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers; — 201

Performing a convolution calculation on the $D_h \times D_w$ grouped image data respectively by a first convolution kernel, to obtain $D_h \times D_w$ grouped convolution operation results; wherein the first convolution kernel is a convolution kernel before the dilation convolution is dilated; — 202

Obtaining a dilation convolution operation result of the input image data, according to the $D_h \times D_w$ grouped convolution operation results. — 203

(58) Field of Classification Search
CPC ....... G06T 2207/20081; G06T 7/10–12; G06T 7/143; G06T 7/194; G06T 2207/20112–20168; G06K 7/1482; G06K 9/0014; G06K 9/00147; G06K 9/00234; G06K 9/00718; G06K 9/00744; G06K 9/00765; G06K 9/34–344; G06K 9/46–4604; G06K 9/4638; G06K 9/50; G06K 9/6201–6211; G06K 9/6296–6297; G06K 9/6256; G06K 9/626; G06K 9/6261; G06K 9/6267–6268; G06K 9/6277–6278; G06N 3/0454; G06N 3/08; G06N 3/084; G06N 3/086; G06N 3/088; G06N 20/00; G06N 20/10; G06N 20/20; G06F 17/16; G06F 7/523; G06V 20/695; G06V 20/698; G06V 20/41; G06V 20/46; G06V 20/49; G06V 40/162; G06V 10/26; G06V 10/267; G06V 10/40; G06V 10/44; G06V 10/457; G06V 10/50; G06V 10/75; G06V 10/757; G06V 10/84; G06V 10/85; G06V 10/774; G06V 10/764; G06V 10/765
See application file for complete search history.

(56) References Cited

U.S. PATENT DOCUMENTS

2021/0312013 A1* 10/2021 Miyamoto .............. G06F 7/523
2021/0326649 A1* 10/2021 Peng ........................ G06T 5/30

* cited by examiner

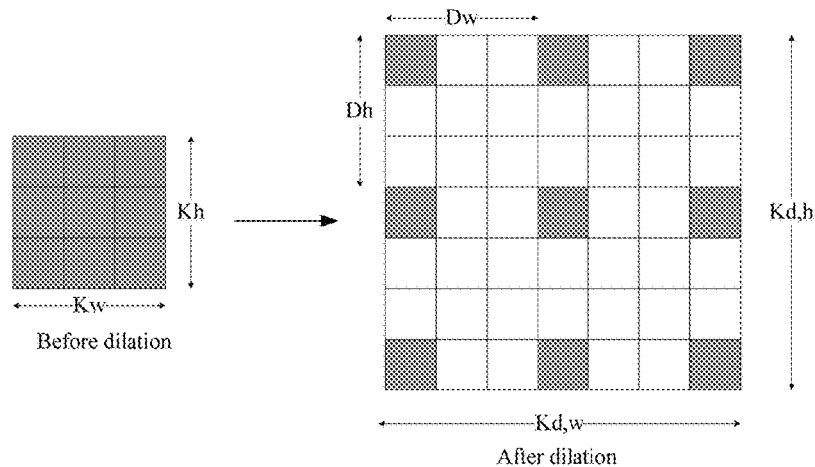

FIG. 1

| Grouping input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers; | 201 |

↓

| Performing a convolution calculation on the $D_h \times D_w$ grouped image data respectively by a first convolution kernel, to obtain $D_h \times D_w$ grouped convolution operation results; wherein the first convolution kernel is a convolution kernel before the dilation convolution is dilated; | 202 |

↓

| Obtaining a dilation convolution operation result of the input image data, according to the $D_h \times D_w$ grouped convolution operation results. | 203 |

FIG. 2

Input feature map: H×W=7×7

After dilation, H'×W' =13×13

Output feature map: H×W=7×7

Remove feature map: H×W=9×9

# IMAGE PROCESSING METHOD AND RELATED DEVICE

1. TECHNICAL FIELD

The present disclosure generally relates to artificial intelligence (AI) technology field, and especially relates to an image processing method and a related device.

2. DESCRIPTION OF RELATED ART

During processing an image, a dilation convolution (also known as a void convolution) is usually used for performing a segmentation operation on the image. Comparing with an ordinary convolution, a dilation rate parameter is invoked in the dilation convolution in addition to a convolution kernel parameter, which is mainly used to indicate a dilation size and increase a receptive field thereof, so that a larger range of information can be contained in each convolution output. The dilation convolution is configured to perform zero insertion processing between elements of a convolution kernel, and then perform a convolution calculation on input image data by using the convolution kernel that has been processed. Zero value void is introduced into the convolution kernel so that many invalid operations are occurred, which results in high power consumption and low efficiency of an image dilation convolution calculation.

SUMMARY

The technical problems to be solved: in view of the shortcomings of the related art, the present disclosure relates to an image processing method and a related device which can beneficial to reducing power consumption and improving efficiency of an image dilation convolution calculation.

In a first respect, an image processing method applied to a computer apparatus and configured to perform a dilation convolution calculation on images, according to an embodiment of the present disclosure includes: grouping input image data of a dilation convolution to obtain Dh×Dw grouped image data; wherein Dh is a dilation rate of a convolution kernel corresponding to the dilation convolution on a height dimension thereof, Dw is a dilation rate of a convolution kernel corresponding to the dilation convolution on a width dimension thereof, and both Dh and Dw are positive integers; performing a convolution calculation on the $D_h \times D_w$ grouped image data respectively by a first convolution kernel, to obtain $D_h \times D_w$ grouped convolution calculation results; wherein the first convolution kernel is a convolution kernel before the dilation convolution is dilated; and obtaining a dilation convolution calculation result of the input image data according to the $D_h \times D_w$ grouped convolution calculation results.

In a second respect, an image processing device applied to a computer apparatus and configured to perform a dilation convolution calculation on images, according to an embodiment of the present disclosure includes: a grouping unit configured to group input image data of a dilation convolution to obtain Dh×Dw grouped image data; wherein Dh is a dilation rate of a convolution kernel corresponding to the dilation convolution on a height dimension thereof, Dw is a dilation rate of a convolution kernel corresponding to the dilation convolution on a width dimension thereof, and both Dh and Dw are positive integers; a calculating unit configured to perform a convolution calculation on the $D_h \times D_w$ grouped image data respectively by a first convolution kernel, to obtain $D_h \times D_w$ grouped convolution calculation results; wherein the first convolution kernel is a convolution kernel before the dilation convolution is dilated; and the calculating unit further configured to obtain a dilation convolution calculation result of the input image data, according to the $D_h \times D_w$ grouped convolution calculation results.

In a third respect, a computer apparatus according to an embodiment of the present disclosure includes a processor, a memory, a communication interface and one or more programs stored in the memory and performed by the processor to implement the image processing method in the first aspect above.

In a fourth aspect, a chip according to an embodiment of the present disclosure includes a processor configured to invoke and perform computer programs from a memory, to cause a device on which the chip is installed to implement the image processing method in the first aspect above.

In a fifth aspect, a computer readable storage medium according to an embodiment of the present disclosure is configured to store computer programs for electronic data interaction, the computer programs performed by a computer to implement the image processing method in the first aspect above.

In a sixth aspect, a computer product according to an embodiment of the present disclosure is configured to be performed by a computer to implement steps of the image processing method above mentioned in the first aspect.

It can be seen that, in an embodiment of the present disclosure, firstly, grouping the input image data of the dilation convolution to obtain the $D_h \times D_w$ grouped image data; wherein, Dh is a dilation rate of a convolution kernel corresponding to the dilation convolution on a height dimension thereof, Dw is a dilation rate of a convolution kernel corresponding to the dilation convolution on a width dimension thereof, and both Dh and Dw are positive integers. And then, performing an ordinary convolution calculation on the $D_h \times D_w$ grouped image data, respectively by the convolution kernel before the dilation convolution is dilated, to obtain $D_h \times D_w$ grouped convolution calculation results. Finally, regrouping the $D_h \times D_w$ grouped convolution calculation results, to obtain the dilation convolution calculation result of the input image data, according to an inverse process of the grouping process. After the input image data is grouped, performing the ordinary convolution calculation on the grouped input image data, by the convolution kernel before dilation (that is, an original convolution kernel without performing zero insertion processing on each element of a convolution kernel), an invalid operation caused by zero dilation introduced into the convolution kernel can be removed, and operation amount is reduced, thereby operation power consumption can be reduced. At the same time, when performing the ordinary convolution calculation on each grouped image data, each grouped image data can be performed in parallel, which is conducive to speed up the operation and improve operation efficiency.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

FIG. 1 is a schematic diagram of a dilation process of a convolution kernel in accordance with an embodiment of the present disclosure.

FIG. 2 is a flowchart of an image processing method in accordance with an embodiment of the present disclosure.

DETAILED DESCRIPTION

Figure 3:
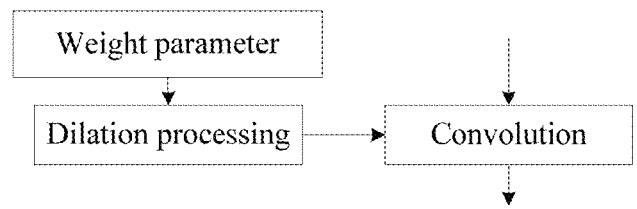
FIG. 3 is a schematic diagram of a dilation convolution calculation in accordance with an embodiment of the present disclosure.

A further detailed description of the present disclosure in combination with the attached drawings and embodiments is provided.

In an image dilation convolution calculation, $K_h$ and $K_w$ respectively represent a height and a width of a convolution kernel before dilation, and $D_h$ and $D_w$ respectively represent dilation rates of the convolution kernel on height (H) and width (W) dimensions, wherein $D_h \geq 1$, $D_w \geq 1$. And then, $K_{d,h}$ and $K_{d,w}$ respectively represent the height and the width of the convolution kernel that has been dilated. The calculation formulas of $K_{d,h}$ and $K_{d,w}$ are respectively shown in formula (1) and formula (2):

$$K_{d,h} = D_h(K_h - 1) + 1 \tag{1}$$

$$K_{d,w} = D_w(K_w - 1) + 1 \tag{2}$$

If $D_h = 1$ and $D_w = 1$, then the convolution is an ordinary convolution.

FIG. 1 is a schematic diagram of a dilation process of a convolution kernel in accordance with an embodiment of the present disclosure. Referring to FIG. 1, a size of the convolution kernel before dilation is 3×3, that is, $K_h = 3$, $K_w = 3$; two zero are inserted between elements in row and column (height and width) directions of the convolution kernel, to obtain a dilation convolution kernel, that is, $D_h = 2$, $D_w = 2$; thereby a size of the dilation convolution kernel is 7×7, that is, $K_{d,h} = 7$, $K_{d,w} = 7$.

FIG. 2 is a flowchart of an image processing method in accordance with an embodiment of the present disclosure. Referring to FIG. 2, the image processing method applied to a computer apparatus and configured to perform a dilation convolution calculation on images, includes, but is not limited to, the following steps.

Step 201, grouping input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers.

In an embodiment of the present disclosure, the step of grouping input image data of the dilation convolution to obtain $D_h \times D_w$ grouped image data, includes: filling the input image data to obtain first image data, according to configuration parameters of the dilation convolution; determining a size of each of the grouped image data according to a size of the first image data; performing dilation processing on the first image data to obtain second image data, according to $D_h$, $D_w$ and the size of each of the grouped image data; and grouping the second image data to obtain the $D_h \times D_w$ grouped image data.

It should be understood that when performing the filling processing on the input image data of the dilation convolution, whether the filling process is required and how to specifically perform the filling process are determined by the configuration parameters of the dilation convolution, which is not particularly limited here.

In an embodiment of the present disclosure, the step of performing the filling processing on the input image data to obtain the first image data, according to the configuration parameters of the dilation convolution, includes: if the configuration parameters of the dilation convolution are indicated that the filling processing is not required, the first image data is the input image data; and if the configuration parameters of the dilation convolution are indicated that the filling processing is required, performing the filling processing on the input image data according to the configuration parameters of the dilation convolution, to obtain the first image data.

When the configuration parameters of the dilation convolution are indicated that the filling processing is not required, the first image data is the input image data; when the configuration parameters of the dilation convolution are indicated that the filling processing is required, performing the filling processing on the input image data according to the configuration parameters of the dilation convolution, to obtain the first image data.

In an embodiment of the present disclosure, the step of performing the dilation processing on the first image data to obtain the second image data, according to $D_h$, $D_w$ and the size of each of the grouped image data, includes: determining a size of the second image data according to $D_h$, $D_w$ and the size of each of the grouped image data; and performing dilation processing that padding $P_h$ rows of zeros after a (H'-1)-th row of the first image data, and performing the dilation processing that padding $P_w$ columns of zeros after a (W'-1)-th column of the first image data, to obtain the second image data; wherein the size of the first image data is H'×W', the size of the second image data is H"×W", $P_h$=H"-H', $P_w$=W"-W'.

There are H' rows of first image data, which are respectively a zero row, a first row, a second row and . . . , a (H'-2)-th row, a (H'-1)-th row; and there are W' columns of first image data, which are respectively a zero column, a first column, a second column and . . . , a (W'-2)-th column, a (W'-1)-th column. Performing the dilation processing that padding $P_h$ rows of zeros after the (H'-1)-th row of the first image data, and performing the dilation processing that padding $P_w$ columns of zeros after the (W'-1)-th column of the first image data, to obtain the second image data.

The grouping process provided for the present disclosure is described in detail below.

It is assumed that the size of the input image data of the dilation convolution is (N, C, H, W); wherein N represents a number of samples (batch), C represents a number of input channels of a convolution, H represents a height of the input image data, and W represents a width of the input image data. It is needed to be noted that arrangement modes of other image data are similarly processed.

Firstly, performing the filling processing on the input image data and then transforming the size of the input image data into (N, C, H', W'), so as to obtain the first image data; wherein H' represents the height of the first image data that has been performed the filling processing, and W' represents the width of the first image data that has been performed the filling processing.

Secondly, performing the grouping processing is to divide the first image data that has been performed the filling processing into $D_h \times D_w$ groups, usually, in order to keep the same size of each of the grouped image data after performing the grouping processing, performing the dilation processing on the first image data that has been performed the filling processing under and on the right of the height (H) and the width (W) dimensions thereof, respectively, that is, performing the dilation processing that padding $P_h$ rows of zeros after the (H'-1)-th row of the first image data, and performing the dilation processing that padding $P_w$ columns of zeros after the (W'-1)-th column of the first image data, to obtain the second image data. If H" and W" respectively represent a height and a width of the second image data, $C_g$ represents the input channel each grouped image data, $H_g$ represents the height each grouped image data, and $W_g$ represents the width of each grouped image data, then:

$$H_g = \lceil H'/D_h \rceil \tag{3}$$

$$W_g = \lceil W'/D_w \rceil \tag{4}$$

$$C_g = C \tag{5}$$

$$H'' = D_h H_g \tag{6}$$

$$W'' = D_w W_g \tag{7}$$

Wherein, $\lceil \ \rceil$ represents a rounding up operation. If a size of the first image data of performing the dilation processing that padding zeros after the (H'-1)-th row of the first image data is $P_h$, and a size of the first image data og performing the dilation processing that padding zeros after the (W'-1)-th column of the first image data is $P_w$, then:

$$P_h = H'' - H' \tag{8}$$

$$P_w = W'' - W' \tag{9}$$

if f (n, c, h, w) represents a pixel position of the second image data that has been performed the dilation filling processing, wherein: $0 \leq n < N$, $0 \leq c < C$, $0 \leq h < H''$, $0 \leq w < W''$, and $g_{i,j}$ (n, $c_g$, $h_g$, $w_g$) represents a pixel position of a (i, j)-th grouped image data, that means:

$$c = c_g \tag{10}$$

$$h = D_h h_g + I, 0 \leq h_g < H_g, 0 \leq i < D_h \tag{11}$$

$$w = D_w w_g + j, 0 \leq w_g < W_g, 0 \leq j < D_w \tag{12}$$

It should be understood that if the size of each grouped image data is (N, $C_g$, $H_g$, $W_g$), then, during the grouping process, dilation enabilities of each grouped image data under and on the right of the height $h_g$ and the width $w_g$ dimension planes can be recorded simultaneously, that is, recording whether zero is filled in the height $h_g$ and the width $w_g$ dimension planes of each grouped image data along its row and column directions thereof.

Step 202, performing the convolution calculation on the $D_h \times D_w$ grouped image data respectively, by a first convolution kernel, to obtain $D_h \times D_w$ grouped convolution calculation results; wherein the first convolution kernel is a convolution kernel before the dilation convolution is dilated.

In an embodiment of the present disclosure, a movement step length of the first convolution kernel is one, when performing the convolution calculation on the grouped image data by using the first convolution kernel.

When performing the convolution calculation on the grouped image data, the convolution performed on each grouped image data is an ordinary convolution, the convolution kernel of the convolution is a convolution kernel before dilation, and it is directly performed the convolution calculation on each grouped image data, rather than performing the filling processing, the movement step length of the convolution kernel is fixed at one. That is, regardless of whether the movement step length of the convolution kernel of the dilation convolutional neural network that has been dilated is one, when it is performed the convolution calculation on the grouped image data by using the convolution kernel of the dilation convolutional neural network before dilation, the movement step length of the convolution kernel is fixed at one.

FIG. 3 is a schematic diagram of a dilation convolution calculation in accordance with an embodiment of the present disclosure. Referring to FIG. 3, a common dilation convolution calculation that the weight parameters has been performed the dilation processing, is converted into an ordinary convolution, in this way, a plurality of invalid weight zero values are generated in the convolution process to be multiplied with pixel values of original input image data, so that low calculation efficiency is occurred.

Figure 4:
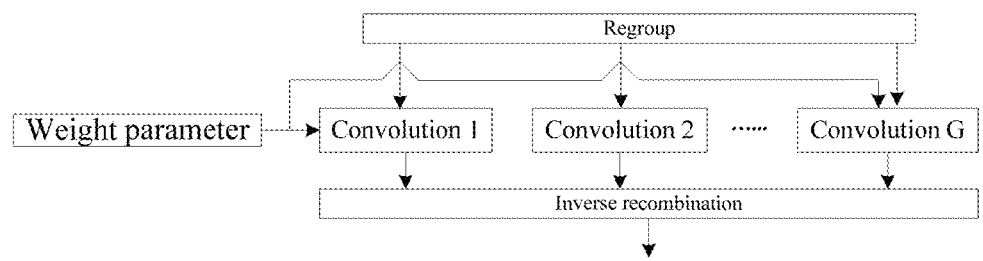
FIG. 4 is a schematic diagram of a group convolution calculation in accordance with an embodiment of the present disclosure.

FIG. 4 is a schematic diagram of a group convolution calculation in accordance with an embodiment of the present disclosure. Referring to FIG. 4, a scheme of the grouping convolution is provided for grouping the input image data of the dilation convolutional neural network to obtain G grouped image data. The grouping process is as described above, $G=D_h \times D_w$; and then, performing the convolution calculation on the G grouped image data by using the same weight parameter, respectively, that is, the same convolution kernel (the convolution kernel of the dilation convolution before dilation) is used to respectively perform convolution 1, convolution 2 and . . . , convolution G, to obtain G grouped convolution calculation results. Finally, performing an inverse recombination on the G grouped convolution calculation results to obtain a dilation convolution calculation result of the input image data calculated by the dilation convolutional neural network. The grouping convolution method is configured to eliminate invalid multiplication caused by the dilation convolution. Since performing the convolution calculation on one input image data is transformed into performing the convolution calculation on a plurality of grouped image data, the convolution calculation between groups can be parallelized and the operation is also easy to be accelerated.

Step 203, obtaining the dilation convolution calculation result of the input image data, according to the $D_h \times D_w$ grouped convolution calculation results.

In an embodiment of the present disclosure, the step of obtaining the dilation convolution calculation result of the input image data, according to the $D_h \times D_w$ grouped convolution calculation results, includes: regrouping the $D_h \times D_w$ grouped convolution calculation results, to obtain a target convolution calculation result, according to an inverse process of the grouping process; if a movement step length of the second convolution kernel is one, the target convolution calculation result is the dilation convolution calculation result of the input image data; if the movement step length of the second convolution kernel is not one, performing extraction processing on the target convolution calculation result, according to the movement step length of the second convolution kernel, to obtain the dilation convolution calculation result of the input image data. The second convolution kernel is a convolution kernel of the dilation convolution.

A final result is restored according to the inverse process of the grouping processing performed on the input image data as shown in the step 201, based on the $D_h \times D_w$ grouped convolution calculation results. Due to the dilation processing is performed during the grouping process, data generated by redundant convolution calculation results are removed in an aggregation process thereof by using the record of the dilation enabilities of each grouped image data under and on the right of the height $h_g$ and the width $w_g$ dimension planes thereof, that is, the record whether zero is filled in the height $h_g$ and the width $w_g$ dimension planes of each grouped image data along row and column directions thereof, among the $D_h \times D_w$ grouped convolution calculation results.

It should be understood that when the movement step length of the dilation convolution kernel that has been dilated is one, the final result recovered according to the inverse process of grouping the input image data in the step 201 is the dilation convolution calculation result of the input image data. When the movement step length of the dilation convolution kernel that has been dilated isn't one, after the inverse recombination, a complete output image data is obtained and then extracted according to the movement step length of the dilation convolution kernel that has been dilated, so that the dilation convolution calculation result of the input image data is obtained.

In an embodiment of the present disclosure, the step of performing the extraction processing on the target convolution calculation result according to the movement step length of the second convolution kernel to obtain the dilation convolution calculation result of the input image data, includes: extracting a (n×k)-th row of data and a (n×k)-th column of data from the target convolution calculation result, wherein n is the movement step length of the second convolution kernel and an integer greater than or equal to two, and k is an integer greater than or equal to zero; forming the dilation convolution calculation result of the input image data according to data that the (n×k)-th row of data is overlapped with the (n×k)-th column of data; and wherein if a size of the target convolution calculation result is H1×W1, n×k is less than or equal to H1, and n×k is less than or equal to W1.

Specifically, when the movement step length of the dilation convolution kernel that has been dilated is n, the (n×k)-th row of data and the (n×k)-th column of data are extracted during the extraction process. The dilation convolution calculation result of the input image data is formed, according to overlapped data that is extracted in the (n×k)-th row of data and the (n×k)-th column of data. Wherein, n is an integer greater than or equal to two, and k is an integer greater than or equal to zero.

As can be seen, when the movement step length of the convolution kernel is not one, the grouping convolution calculation is uniformly performed according to that the movement step length of the convolution kernel is one, and then the grouped convolution calculation result is extracted according to that the movement step length of the convolution kernel is not one, so that the dilation convolution calculation result can be obtained that the movement step length of the convolution kernel is not one. Thus, such scheme has advantages of wide applications and can be applied to the dilation convolution calculation with any movement step lengths.

Since high efficiency of both the ordinary dilation convolution calculation and the grouping convolution calculation provided in the present disclosure is affected by the configuration parameters of the dilation convolutional neural network, an optimal mode can be selected according to an actual situation. Specifically, evaluating costs of the two operations according to the configuration parameters collected from the dilation convolutional neural network; selecting the optimal mode to perform the dilation convolution calculation according to an evaluation result. The configuration parameters generally include a size of the convolution kernel, a dilation rate, a movement step length of the dilation convolution kernel that has been dilated, a size of the input image data, etc. The cost can be an operation time or a number of operations or a combination of the two above.

As the image processing method is described in FIG. 2, firstly, grouping the input image data of the dilation convolution to obtain the $D_h \times D_w$ grouped image data; wherein, $D_h$ is the dilation rate of the convolution kernel corresponding to the dilation convolution on a height dimension thereof, $D_w$ is the dilation rate of the convolution kernel corresponding to the dilation convolution on a width dimension thereof, and both $D_h$ and $D_w$ are positive integers. And then, performing a general convolution calculation on the $D_h \times D_w$ grouped image data, respectively, by the convolution kernel before the dilation convolution is dilated, to obtain $D_h \times D_w$ grouped convolution calculation results. Finally, regrouping the $D_h \times D_w$ grouped convolution calculation results, to obtain the dilation convolution calculation result of the input image data, according to the inverse process of the grouping process. After the input image data is grouped, performing the ordinary convolution calculation on the grouped input image data by the convolution kernel before dilation (that is, an original convolution kernel without performing zero insertion processing on each element of the convolution kernel), an invalid operation caused by zero dilation introduced into the convolution kernel can be removed, and operation amount is reduced, thereby operation power consumption can be reduced. At the same time, when performing the ordinary convolution calculation on each grouped image data, each grouped image data can be performed in parallel, which is conducive to speed up the operation and improve operation efficiency.

The technical solutions provided in the present disclosure are described in detail below with reference to specific examples.

In an embodiment of the present disclosure, the convolution kernel before dilation and the convolution kernel that has been dilated are shown in FIG. 1, the size of the convolution kernel before dilation is 3×3, and the size of the convolution kernel that has been dilated is 7×7, that is, $K_h=3$, $K_w=3$, $D_h=3$, $D_w=3$, $K_{d,\ h}=3\times(3-1)+1=7$, $K_{d,\ w}=3\times(3-1)+1=7$. Therefore, when grouping the input image data, the input image data is necessary to be divided into $D_h \times D_w = 3 \times 3 = 9$ groups.

Figure 5:
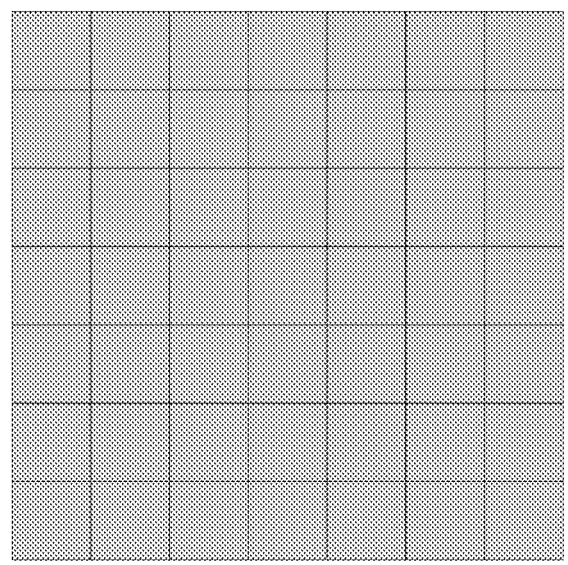
FIG. 5 is a schematic diagram of input image data in accordance with an embodiment of the present disclosure.

Firstly, as shown in FIG. 5, a size of the input image data of the dilation convolutional neural network is 7×7, that is, H=7 and W=7.

Figure 6:
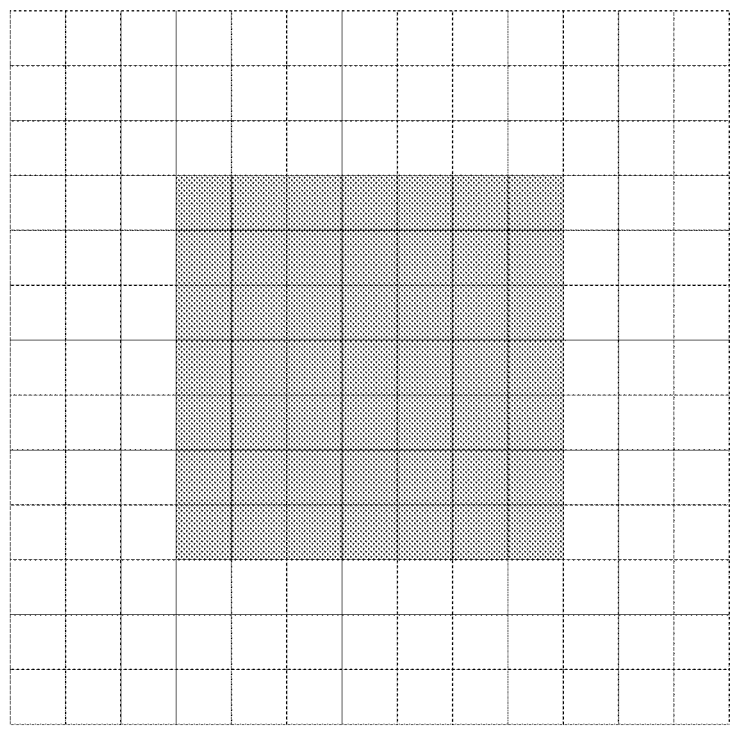
FIG. 6 is a schematic diagram of image data that has been performed filling processing in accordance with an embodiment of the present disclosure.

Secondly, performing the filling processing on the input image data; specifically, the periphery of the input image data is filled with three circles of zeros to obtain first image data. As shown in FIG. 6, a size of the first image data is 13×13, that is, H'=13, W'=13.

Figure 7:
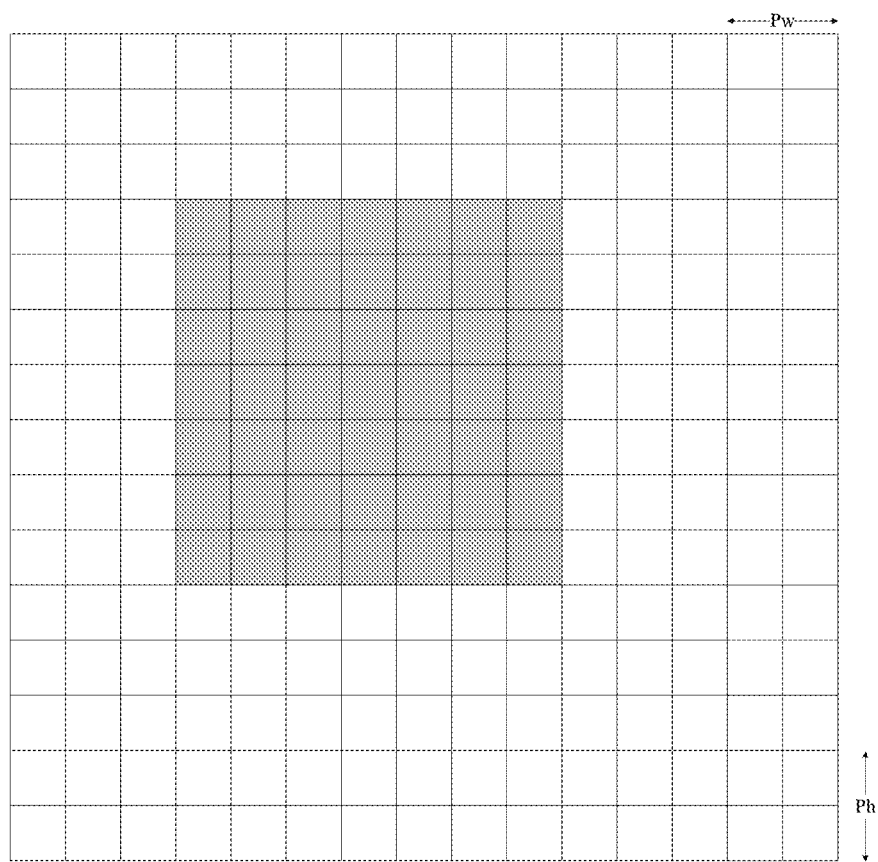
FIG. 7 is a schematic diagram of the image data that has been performed dilation processing in accordance with an embodiment of the present disclosure.
Figure 8:
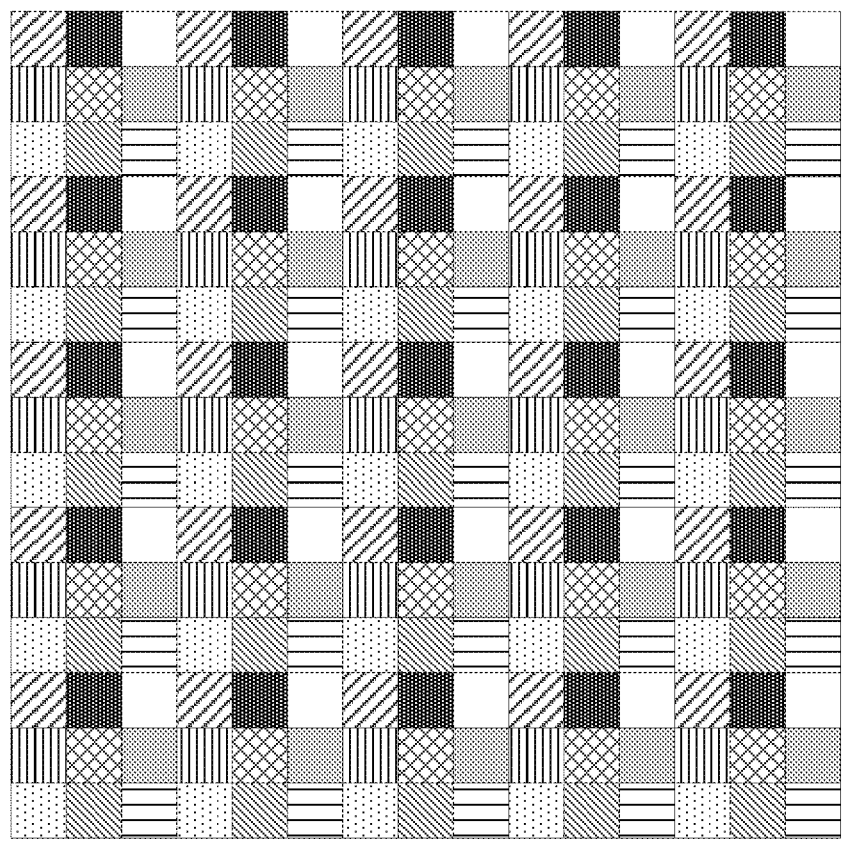
FIG. 8 is a schematic diagram of the image data before being grouped in accordance with an embodiment of the present disclosure.
Figure 9:
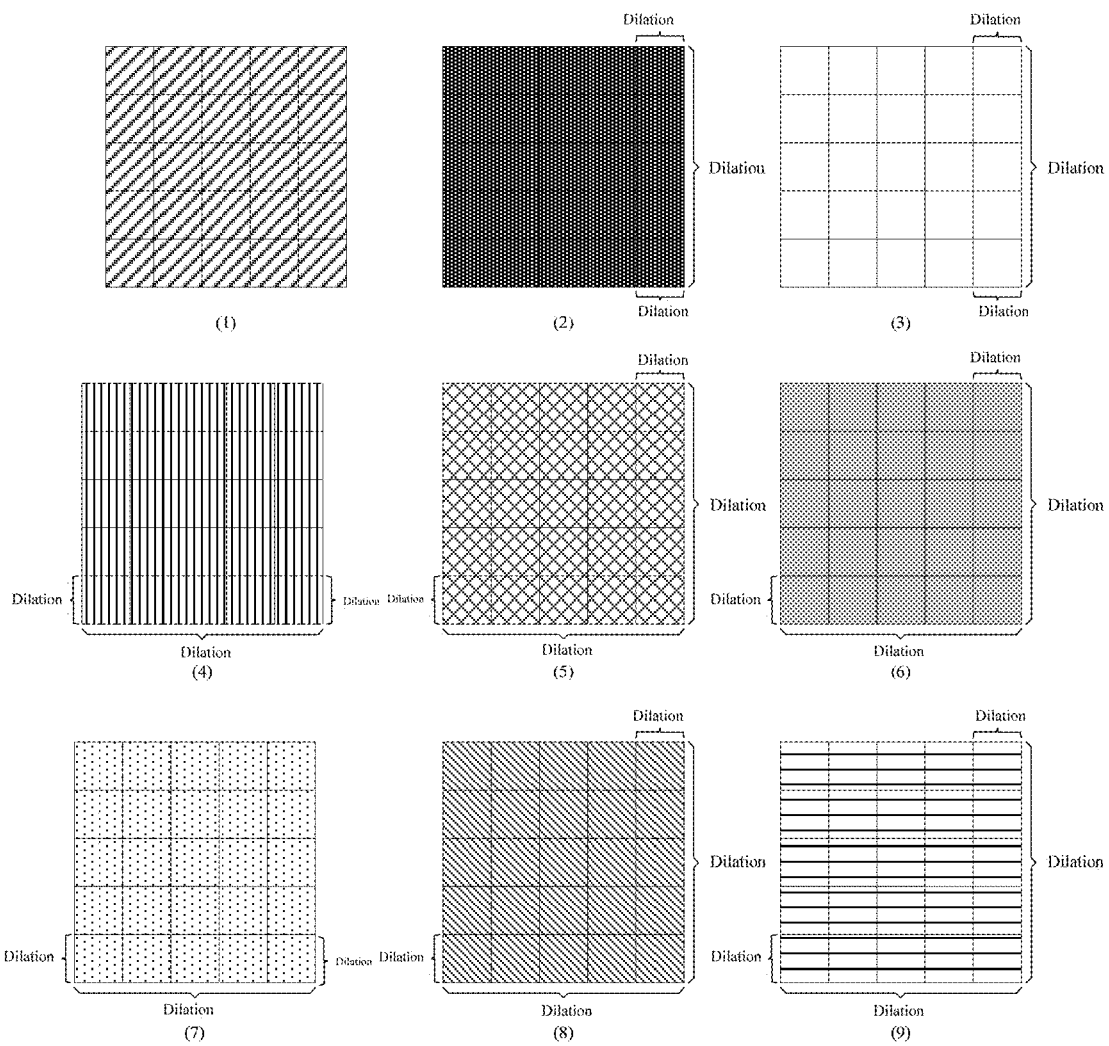
FIG. 9 is a schematic diagram of grouped image data that has been grouped in accordance with an embodiment of the present disclosure.
Figure 10:
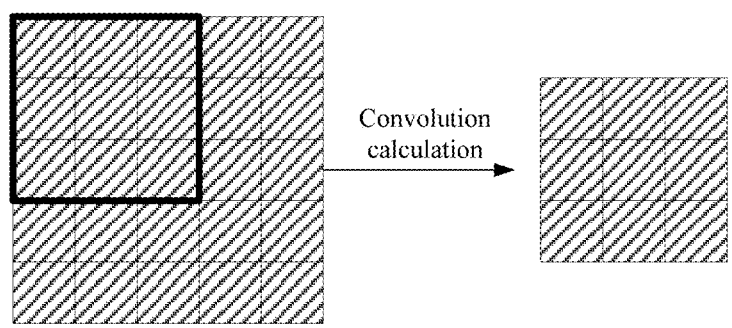
FIG. 10 is schematic diagrams of a convolution of first grouped image data in accordance with an embodiment of the present disclosure.
Figure 11:
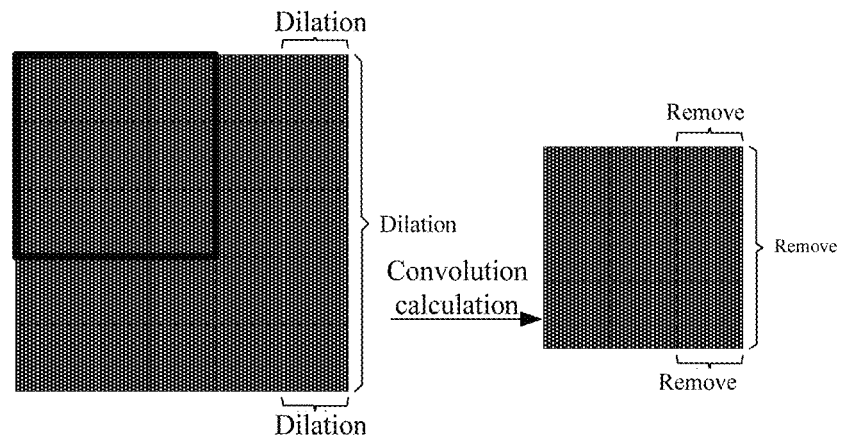
FIG. 11 is a schematic diagram of a convolution of second grouped image data in accordance with an embodiment of the present disclosure.
Figure 12:
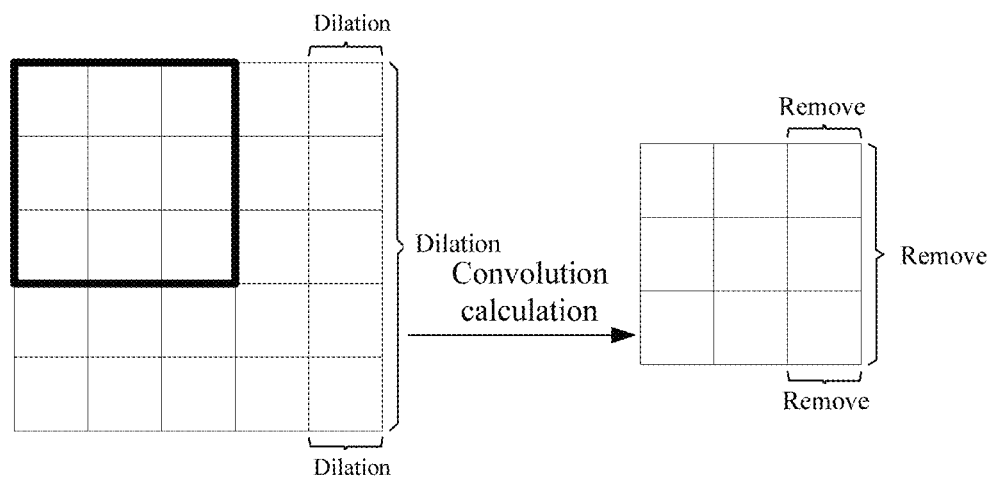
FIG. 12 is a schematic diagram of a convolution of third grouped image data in accordance with an embodiment of the present disclosure.
Figure 13:
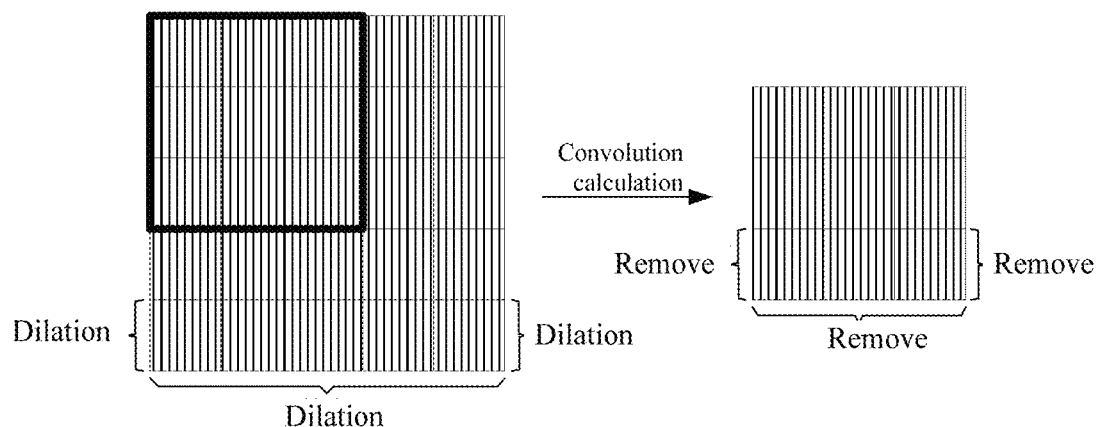
FIG. 13 is a schematic diagram of results of a convolution of fourth grouped image data in accordance with an embodiment of the present disclosure.
Figure 14:
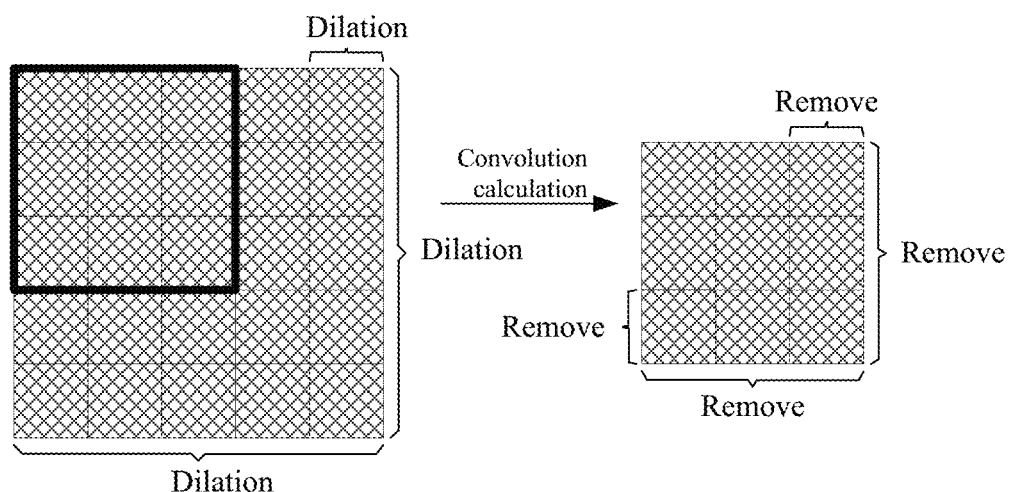
FIG. 14 is a schematic diagram of a convolution of fifth grouped image data in accordance with an embodiment of the present disclosure.
Figure 15:
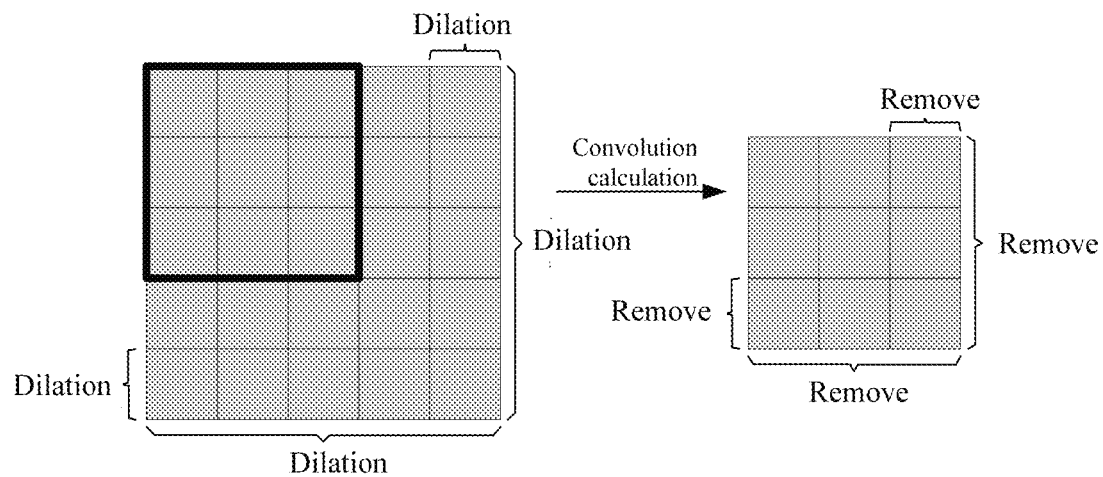
FIG. 15 is a flowchart of a convolution of sixth grouped image data in accordance with an embodiment of the present disclosure.
Figure 16:
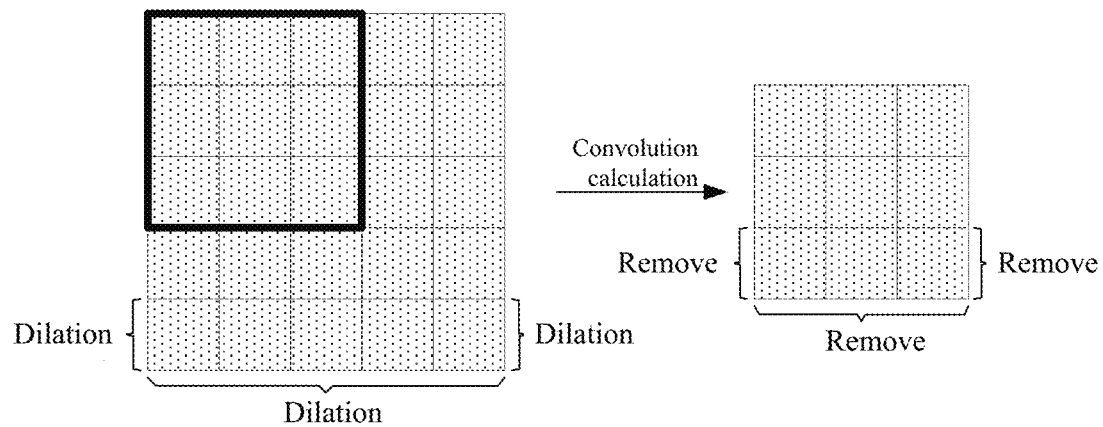
FIG. 16 is a schematic diagram of a convolution of seventh grouped image data in accordance with an embodiment of the present disclosure.
Figure 17:
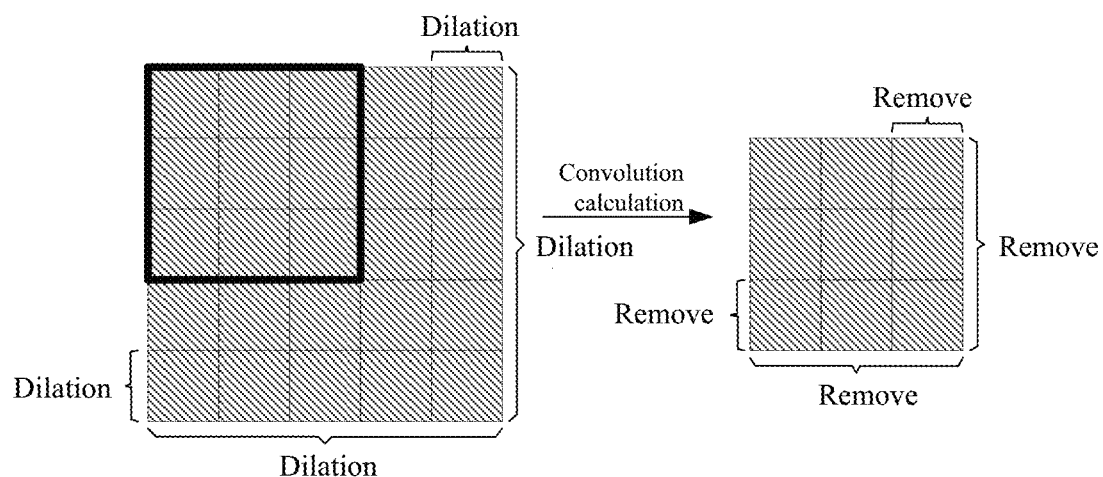
FIG. 17 is a schematic diagram of a convolution of eighth grouped image data in accordance with an embodiment of the present disclosure.
Figure 18:
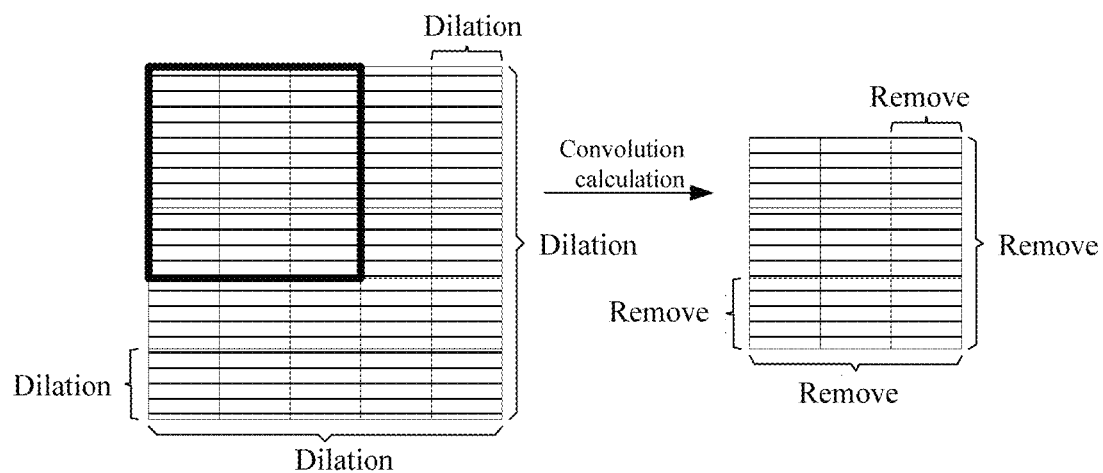
FIG. 18 is a schematic diagram of a convolution of ninth grouped image data in accordance with an embodiment of the present disclosure.

Thirdly, obtaining $P_h=2$, $P_w=2$ according to the following calculation; performing dilation and filling processing with two rows of zeros on the first image data after the thirteenth row thereof the first image data and performing the dilation and filling processing with two columns of zeros on the first image data after the thirteenth column thereof, to obtain second image data. As shown in FIG. 7 or FIG. 8, a size of the second image data is 15×15, and there are:

$H_g=[13/3]=5, W_g=[13/3]=5;$ $H''=3\times5=15, W''=3\times5=15;$ $P_h=15-13=2, P_w=15-13=2.$ Fourthly, grouping the second image data to obtain nine grouped image data, and recording dilation enabling conditions of each grouped image data; as shown in FIG. 9, a size of each grouped image data is 5×5, first grouped image data isn't dilated and filled with zeros, a fifth column of second grouped image data is dilated and filled with zeros, the fifth column of third grouped image data is dilated and filled with zeros, a fifth row of fourth grouped image data is dilated and filled with zeros, both the fifth row and the fifth column of fifth grouped image data are dilated and filled with zeros, both the fifth row and the fifth column of sixth grouped image data are dilated and filled with zeros, the fifth row of seventh grouped image data is dilated and filled with zeros, both the fifth row and the fifth column of eighth grouped image data are dilated and filled with zeros, both the fifth row and the ninth column of ninth grouped image data are dilated and filled with zeros.

Fifthly, performing sliding window processing on the nine grouped image data, respectively, by using 3×3 convolution kernels before dilation and according to the movement step length of one, to obtain nine grouped convolution calculation results. As shown in FIGS. 10-18, a size of each grouped convolution calculation result is 3×3, so that the sliding window process as shown in FIGS. 10-18 can be performed in parallel.

Figure 19:
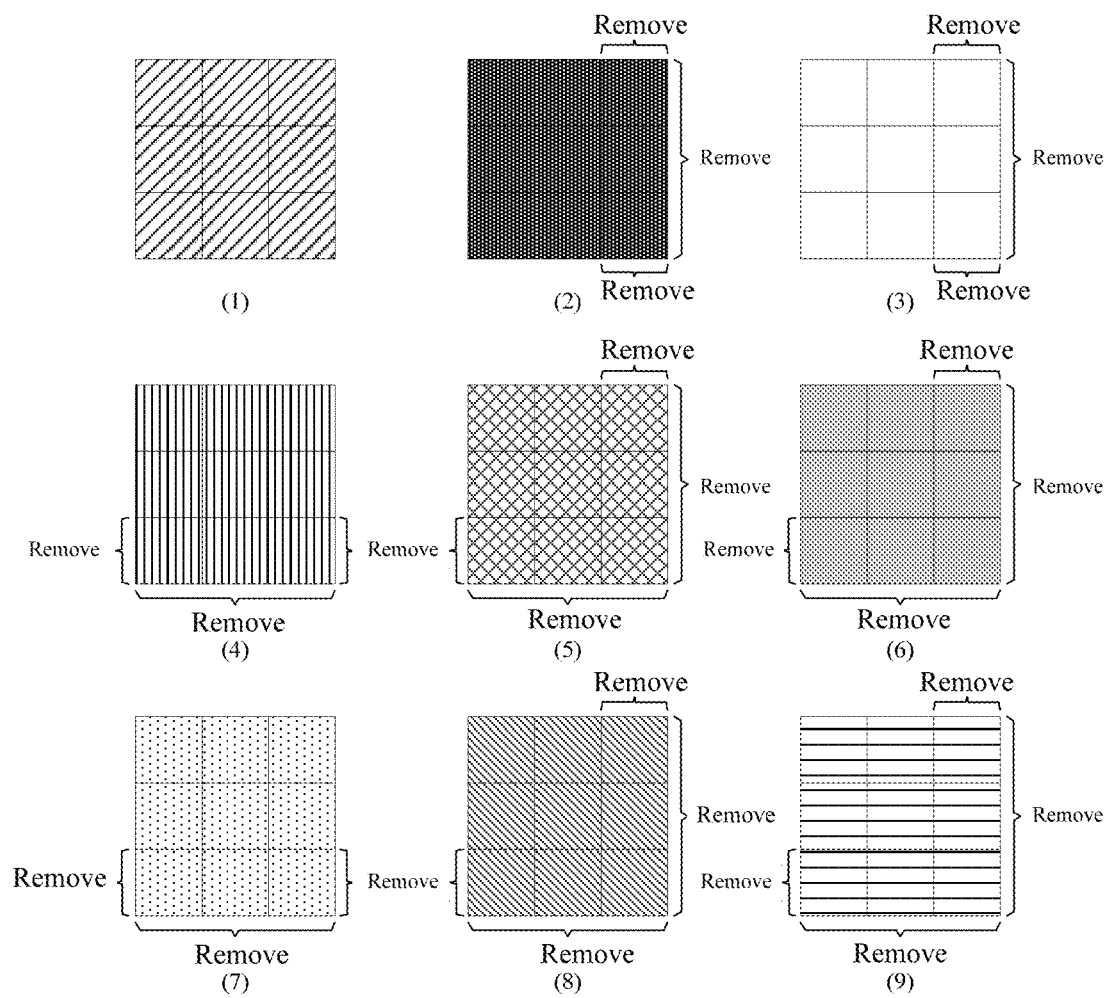
FIG. 19 is a schematic diagram of a grouped convolution calculation result in accordance with an embodiment of the present disclosure.
Figure 20:
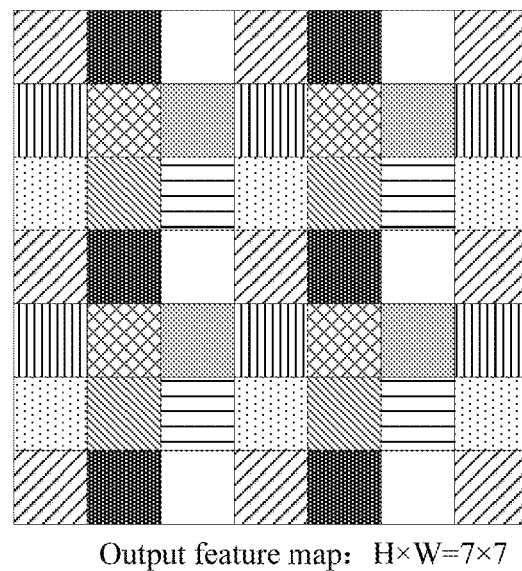
FIG. 20 is a schematic diagram of output image data in accordance with an embodiment of the present disclosure.

Sixthly, performing an inverse recombination of the grouping processing on the nine grouped convolution calculation results, by using the dilation enabling conditions of each grouped image data under and on the right of the height $h_g$ and the width $w_g$ dimension planes thereof, to obtain a dilation convolution calculation result of the input image data. As shown in FIG. 19, in the inverse recombination, no data in a first grouped convolution calculation result is needed to be removed, data in a third column of a second grouped convolution calculation result is needed to be removed, data in the third column of a third grouped convolution calculation result is needed to be removed, data in a third row of a fourth grouped convolution calculation result is needed to be removed, data in both the third row and the third column of a fifth grouped convolution calculation result are needed to be removed, data in both the third row and the third column of a sixth grouped convolution calculation result are needed to be removed, data in the third row of a seventh grouped convolution calculation result is needed to be removed, data in both the third row and the third column of an eighth grouped convolution calculation result are needed to be removed, data in both the third row and the third column of a ninth grouped convolution calculation result are needed to be removed. After redundant data is removed, output image data is obtained by performing recombination processing according to the inverse process of the grouping processing. As shown in FIG. 20, a size of the output image data is H2×W2=7×7.

Figure 21:
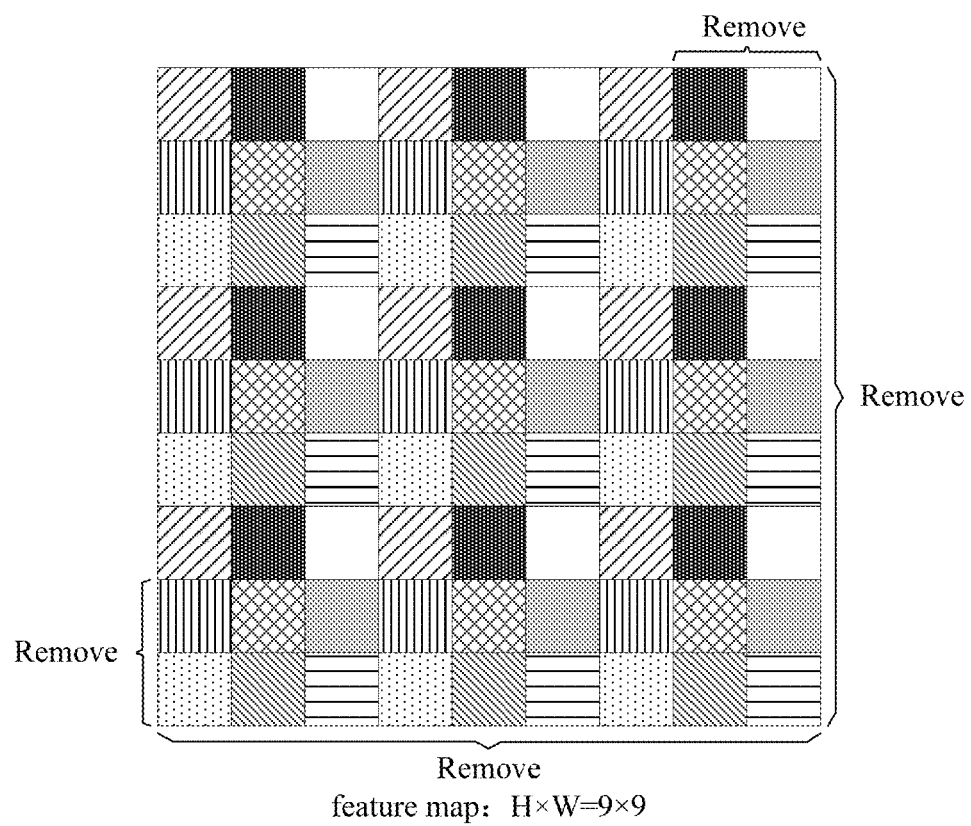
FIG. 21 is a schematic diagram of inverse recombination image data in accordance with an embodiment of the present disclosure.

After nine grouped convolution calculation results are calculated, the complete image data can be obtained by first performing the inverse recombination of the grouping processing. Referring to FIG. 21, a size of the complete image data is H3×W3=9×9, wherein, data in all an eighth row, a ninth row, an eighth column and a ninth column are needed to be removed, the output image data as shown in FIG. 20 can be obtained by removing data in all the eighth row, the ninth row, the eight column and the ninth column.

Figure 22:
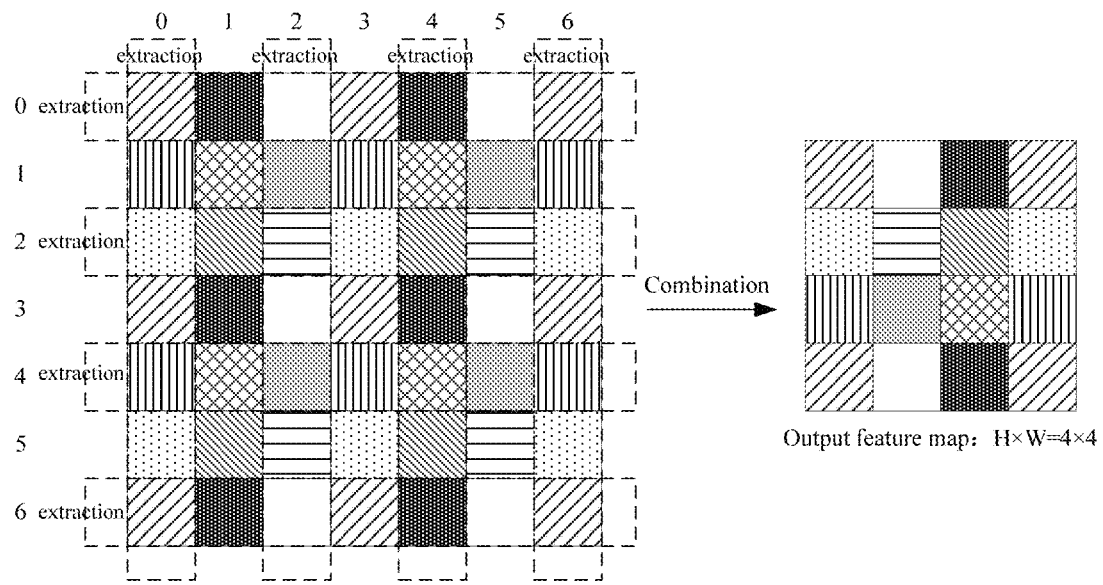
FIG. 22 is a schematic diagram of image data extraction and recombination in accordance with an embodiment of the present disclosure.

Furthermore, when the movement step length of the convolution kernel that has been dilated isn't one, data that has been obtained is needed to be extracted. It is assumed that each movement step length of the convolution kernel in respective height and width directions thereof is two, the extraction process is shown in FIG. 22. data of a zero row, a second row, a fourth row and a sixth row are extracted along a row direction, and data of a zero column, a second column, a fourth column and a sixth column are extracted along the column direction, in this way, the dilation convolution calculation result of the input image data can be formed, forming the dilation convolution calculation result of the input image data, according to overlapped data that extraction data is overlapped. That is, according to data of row 0 column 0, row 0 column $2^{nd}$, row 0 column $4^{th}$, row 0 column $6^{th}$, row $2^{nd}$ column 0, row $2^{nd}$ column $2^{nd}$, row $2^{nd}$ column $4^{th}$, row $2^{nd}$ column $6^{th}$, row $4^{th}$ column 0, row $4^{th}$ column $2^{nd}$, row $4^{th}$ column $4^{th}$, row $2^{nd}$ column $6^{th}$, row $6^{th}$ column 0, row $6^{th}$ column $2^{nd}$, row $6^{th}$ column $4^{th}$, row $6^{nd}$ column $6^{th}$. A size of the dilation convolution calculation result of the input image data is H4×W4=4×4.

The method in accordance with embodiments of the present disclosure is described above in detail and an apparatus according to an embodiment of the present disclosure is provided below.

Figure 23:
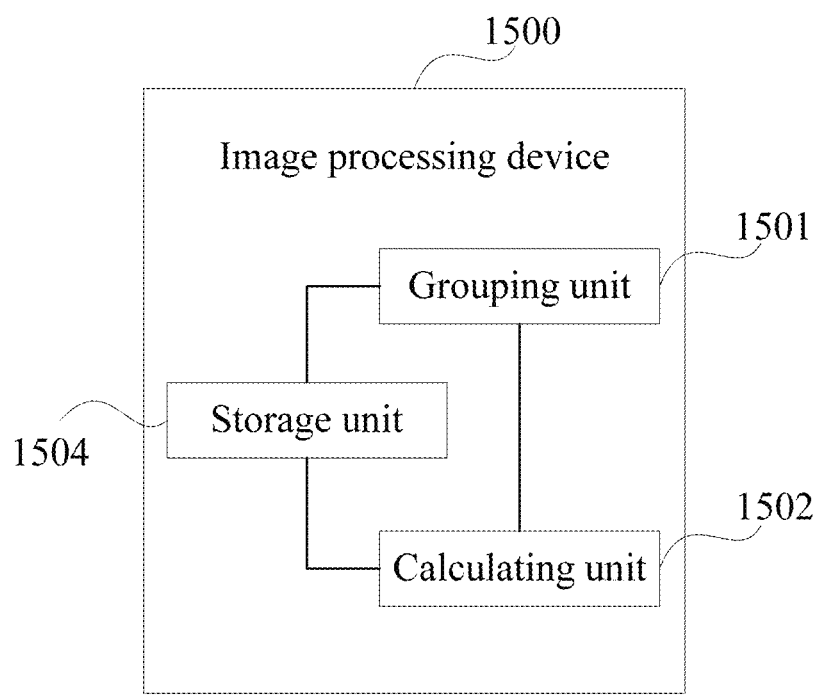
FIG. 23 is a schematic diagram of an image processing device in accordance with an embodiment of the present disclosure.

FIG. 23 is a schematic diagram of an image processing device in accordance with an embodiment of the present disclosure. Referring to FIG. 23, the image processing device 2300 is applied to a computer apparatus and configured to perform a dilation convolution calculation on images, can include: a grouping unit 2301 and a calculating unit 2302. Each unit is described in detail as follows:

the grouping unit 2301 is configured to group input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers;

the calculating unit 2302 is configured to perform a convolution calculation on the $D_h \times D_w$ grouped image data respectively by a first convolution kernel, to obtain $D_h \times D_w$ grouped convolution calculation results; wherein the first convolution kernel is a convolution kernel before the dilation convolution is dilated;

the calculating unit 2302 is further configured to obtain a dilation convolution calculation result of the input image data, according to the $D_h \times D_w$ grouped convolution calculation results.

In an embodiment of the present disclosure, the grouping unit 2301 is specifically configured to perform filling processing on the input image data to obtain first image data, according to configuration parameters of the dilation convolution; determine a size of each grouped image data according to a size of the first image data; perform dilation processing on the first image data to obtain second image data according to $D_h$, $D_w$ and the size of each grouped image data; and group the second image data to obtain the $D_h \times D_w$ grouped image data.

In an embodiment of the present disclosure, the grouping unit 2301 is specifically configured to: determine a size of the second image data according to $D_h$, $D_w$ and the size of each of the grouped image data; and perform the dilation processing with $P_h$ rows of zeros on the first image data after a (H'-1)-th row thereof, and performing the dilation processing that padding $P_w$ columns of zeros after a (W'-1)-th column of the first image data, to obtain the second image data; wherein the size of the first image data is H'×W', the size of the second image data is H"×W", $P_h$=H"-H', $P_w$=W"-W'.

In an embodiment of the present disclosure, a movement step length of the first convolution kernel is one, when performing the convolution calculation on the grouped image data by using the first convolution kernel.

In an embodiment of the present disclosure, the calculating unit 2302 is further configured to: regroup the $D_h \times D_w$ grouped convolution calculation results according to an inverse process of the grouping process, to obtain a target convolution calculation result; if a movement step length of the second convolution kernel is one, determine the target convolution calculation result is the dilation convolution calculation result of the input image data; if the movement step length of the second convolution kernel is not one, perform extraction processing on the target convolution calculation result, according to the movement step length of the second convolution kernel, to obtain the dilation convolution calculation result of the input image data. The second convolution kernel is a convolution kernel of the dilation convolution.

It should be noted that an implementation of each unit can also correspond to corresponding descriptions of the embodiment of the present method as shown in FIG. 2. Of course, the image processing device 2300 in accordance with an embodiment of the present disclosure includes, but is not limited to, the above unit modules, for example, the image processing device 2300 can further include a storage unit 2303 configured to store program codes and data of the image processing device 2300.

In the image processing device 2300 described in FIG. 23, firstly, grouping the input image data of the dilation convolution to obtain the $D_h \times D_w$ grouped image data; wherein, Dh is a dilation rate of a convolution kernel corresponding to the dilation convolution on a height dimension thereof, Dw is a dilation rate of a convolution kernel corresponding to the dilation convolution on a width dimension thereof, and both Dh and Dw are positive integers. And then, performing an ordinary convolution calculation on the $D_h \times D_w$ grouped image data, respectively by the convolution kernel before the dilation convolution is dilated, to obtain $D_h \times D_w$ grouped convolution calculation results. Finally, regrouping the $D_h \times D_w$ grouped convolution calculation results, to obtain the dilation convolution calculation result of the input image data, according to an inverse process of the grouping process. After the input image data is grouped, performing the ordinary convolution calculation on the grouped input image data, by the convolution kernel before dilation (that is, an original convolution kernel without performing zero insertion processing on each element of a convolution kernel), an invalid operation caused by zero dilation introduced into the convolution kernel can be removed, and operation amount is reduced, thereby operation power consumption can be reduced. At the same time, when performing the ordinary convolution calculation on each grouped image data, each grouped image data can be performed in parallel, which is conducive to speed up the operation and improve operation efficiency.

Figure 24:
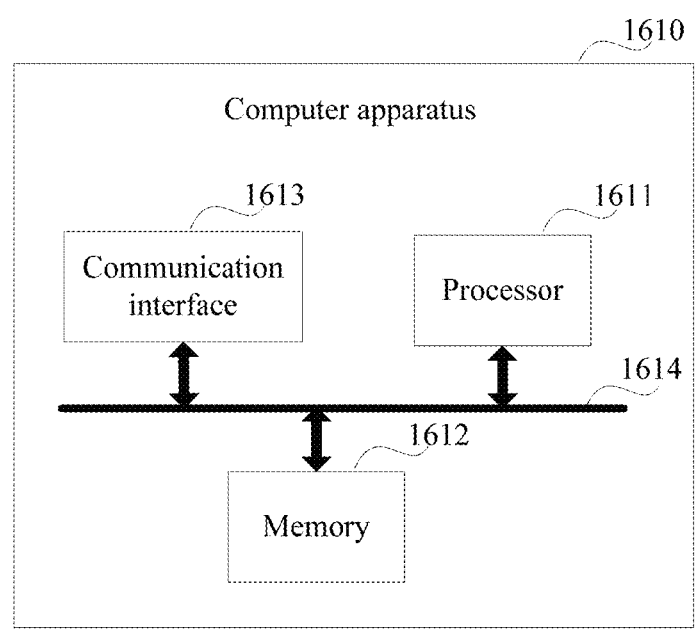
FIG. 24 is a schematic diagram of a computer apparatus in accordance with an embodiment of the present disclosure.

FIG. 24 is a schematic diagram of a computer apparatus 2410 in accordance with an embodiment of the present disclosure. The computer apparatus 2410 includes a processor 2411, a memory 2412, a communication interface 2413 are connected with each other through a bus 2414.

The memory 2412 includes, but is not limited to, a Random Access Memory (RAM), a Read-Only Memory (ROM), an Erasable Programmable Read Only Memory (EPROM), or a Compact Disc Read-Only Memory (CDRM). The memory 2412 is configured to store related computer programs and data, and the communication interface 2413 is configured to receive and send data.

The processor 2411 can be one or more central processing units (CPUs). In cases of the processor 2411 is a single CPU, the CPU can be either a single-core or a multi-core.

The processor 2411 within the computer apparatus 2410 is configured to read the computer program codes stored in the memory 2412 to perform the following operations: grouping input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers. Performing a convolution calculation on the $D_h \times D_w$ grouped image data respectively by a first convolution kernel, to obtain $D_h \times D_w$ grouped convolution calculation results; wherein, the first convolution kernel is a convolution kernel before the dilation convolution is dilated. Obtaining a dilation convolution calculation result of the input image data according to the $D_h \times D_w$ grouped convolution calculation results.

It should be noted that an implementation of each operation can also correspond to corresponding descriptions of the embodiment of the present method as shown in FIG. 2.

In the computer apparatus 2410 described in FIG. 24, firstly, grouping the input image data of the dilation convolution to obtain the $D_h \times D_w$ grouped image data; wherein, Dh is a dilation rate of a convolution kernel corresponding to the dilation convolution on a height dimension thereof, Dw is a dilation rate of a convolution kernel corresponding to the dilation convolution on a width dimension thereof, and both Dh and Dw are positive integers. And then, performing an ordinary convolution calculation on the $D_h \times D_w$ grouped image data, respectively by the convolution kernel before the dilation convolution is dilated, to obtain $D_h \times D_w$ grouped convolution calculation results. Finally, regrouping the $D_h \times D_w$ grouped convolution calculation results, to obtain the dilation convolution calculation result of the input image data, according to an inverse process of the grouping process. After the input image data is grouped, performing the ordinary convolution calculation on the grouped input image data, by the convolution kernel before dilation (that is, an original convolution kernel without performing zero insertion processing on each element of a convolution kernel), an invalid operation caused by zero dilation introduced into the convolution kernel can be removed, and operation amount is reduced, thereby operation power consumption can be reduced. At the same time, when performing the ordinary convolution calculation on each grouped image data, each grouped image data can be performed in parallel, which is conducive to speed up the operation and improve operation efficiency.

A chip according to an embodiment of the present disclosure includes at least one processor, a memory and an interface circuit. The memory, a transceiver and the at least one processor are connected by a circuit, and computer programs are stored in at least one memory and performed by the at least one processor to implement steps of the image processing method of FIG. 2.

A computer readable storage medium according to an embodiment of the present disclosure is configured to store computer programs which are performed by a computer to implement steps of the image processing method of FIG. 2.

A computer program product in accordance with an embodiment of the present disclosure is provided and performed by a computer to implement steps of the image processing method of FIG. 2.

It should be noted that the processor according to an embodiment of the present disclosure can be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor can be a microprocessor or any conventional processors, etc.

It is also understood that the memory described in the embodiment of the present disclosure can be a volatile memory or a non-volatile memory or both the volatile memory and the non-volatile memory. Furthermore, the non-volatile memory can be a Read-Only Memory (ROM), a Programmable Read-Only Memory (PROM), an Erasable Programmable Read-Only Memory (EPROM), an Electrically Erasable Programmable Read-Only Memory (EEPROM) or a flash memory. The volatile memory can be a Random Access Memory (RAM) acted as an external cache. By exemplary but not restrictive illustrations, many forms of RAMs can be available, for example, a Static Random Access Memory (SRAM), a Dynamic Random Access Memory (DRAM), a Synchronous Dynamic Random Access Memory (Synchronous DRAM, SDRAM), a Double DataRate Synchronous Dynamic Random Access Memory (Double DataRate SDRAM, DDR SDRAM), an Enhanced Synchronous Dynamic Random Access Memory (Enhanced SDRAM, ESDRAM), a Synchlink Dynamic Random Access Memory (SLDRAM) and a Direct Rambus RANI (DR RAM).

It should be noted that when the processor is a general-purpose processor, a DSP, an ASIC, an FPGA or other programmable logic devices, a discrete gate or a transistor logic device, a discrete hardware component, the memory (storage module) is integrated with the processor.

It should be noted that the memory described herein is intended to include, but is not limited to, these and any other appropriate types of memories.

It should also be understood that: terms "first", "second", "third", "fourth" and various feature serial numbers are used only to conveniently distinguish the describe the present disclosure without being intent to limit the protection scope of the present disclosure.

It can be understood that, the term "and/or" of the present disclosure is only used to simply describe association relations of related subjects, which is indicated that three kinds of relations are formed between the related subjects. For example, A and/or B can be expressed as: A exists alone, both A and B exist at the same time, and B exists alone. In addition, a character "/" in the present disclosure is generally indicated that an "OR" relationship is formed between the associative subjects before and after.

It can be understood that, in various embodiments of the present disclosure, the magnitude of the serial number in the above process can't be intent to imply execution sequences, the execution sequence of each process should be determined by functions and internal logics, rather than constituted any limitation of the embodiments of the present disclosure.

An ordinary skilled person in the art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

An ordinary skilled person in the art can be clearly understood that: for convenient and simple description, a specific working process of the system, the device, and the unit described above can be referred to the corresponding process in the embodiment of the above method, which will not be repeated here.

It should be understood that the disclosed system, device and method in the embodiments provided by the present disclosure can be implemented in other ways. For example, the embodiments of the device described above are merely schematic; for example, the division of the units is merely a division of logical functions, which can also be realized in other ways; for example, multiple units or components can combined or integrated into another system, or some features can be ignored or not implemented. On the other hand, the coupling, direct coupling or communication connection shown or discussed may be achieved through some interfaces, indirect coupling or communication connection between devices or units may electrical, mechanical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, each functional unit in each embodiment of the present disclosure can be integrated in a processing unit, or each unit can be separately formed with a physical form, or two or more units can be integrated in one unit.

The integrated units may be stored in a computer readable memory if implemented as a software program module and sold or used as a separate product. Based on this understanding, in nature, the technical solutions of the application or the part that contributes to the existing technology, or all or part of the technical solution can be manifested in the form of software products, the computer software products stored in a memory, including several instructions to make a computer equipment (such as a personal computer, a server or a network equipment, etc.) to perform all or part of the steps of the method described in each embodiment of this application. The aforementioned memory includes: a USB flash drive, a ROM (Read-Only Memory), a RAM (Random Access Memory), a mobile hard disk drive, a diskette or a CD-ROM or other storage medium that can store program codes.

The steps of the method in accordance with embodiments of the present disclosure can be sequentially adjusted, combined and deleted according to actual needs.

The modules of the device in accordance with embodiments of the present disclosure can be merged, divided and deleted according to actual needs.

The above embodiments are used only to describe, but not limited to, the technical solution of the present disclosure. Although the features and elements of the present disclosure are described as embodiments in particular combinations, an ordinary skilled person in the art should understand that: each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An image processing method applied to a computer apparatus and configured to perform a dilation convolution calculation on images, the image processing method comprising:
grouping input image data of a dilation convolution to obtain $D_h \times D_w$ grouped image data; wherein $D_h$ is a dilation rate of a convolution kernel corresponding to the dilation convolution on a height dimension thereof, $D_w$ is a dilation rate of a convolution kernel corresponding to the dilation convolution on a width dimension thereof, and both $D_h$ and $D_w$ are positive integers; wherein the step of grouping input image data of a dilation convolution to obtain $D_h \times D_w$ grouped image data, comprises:
filling the input image data to obtain first image data, according to configuration parameters of the dilation convolution;
determining a size of each of the grouped image data according to a size of the first image data;
performing dilation processing on the first image data to obtain second image data, according to $D_h$, $D_w$ and the size of each of the grouped image data, wherein the step of performing dilation processing on the first image data to obtain second image data, according to Dh, Dw and the size of each of the grouped image data, comprises:
determining a size of the second image data according to Dh, Dw and the size of each of the grouped image data; and
performing the dilation processing that padding Ph rows of zeros after an (H'-1)-th row of the first image data, and performing the dilation processing that padding Pw columns of zeros after a (W'-1)-th column of the first image data, to obtain the second image data; wherein the size of the first image data is H'×W', the size of the second image data is H"×W", Ph=H"−H', and Pw=W"−W'; and
grouping the second image data to obtain the $D_h \times D_w$ grouped image data;
performing a convolution calculation on the $D_h \times D_w$ grouped image data, respectively, by a first convolution kernel, to obtain $D_h \times D_w$ grouped convolution calculation results; wherein the first convolution kernel is a convolution kernel of a convolution before the dilation convolution is dilated; and
obtaining a dilation convolution calculation result of the input image data according to the $D_h \times D_w$ grouped convolution calculation results.

2. The image processing method as claimed in claim 1, wherein a movement step length of the first convolution kernel is one, when performing the convolution calculation on the grouped image data by using the first convolution kernel.

3. The image processing method as claimed in claim 2, wherein the step of obtaining a dilation convolution calculation result of the input image data according to the $D_h \times D_w$ grouped convolution calculation results, comprises:
regrouping the $D_h \times D_w$ grouped convolution calculation results, to obtain a target convolution calculation result, according to an inverse process of the grouping process;
if a movement step length of a second convolution kernel is one, the target convolution calculation result is the dilation convolution calculation result of the input image data;
if the movement step length of the second convolution kernel is not one, performing extraction processing on the target convolution calculation result according to the movement step length of the second convolution kernel, to obtain the dilation convolution calculation result of the input image data; and wherein
the second convolution kernel is a convolution kernel of the dilation convolution.

4. The image processing method as claimed in claim 3, wherein the step of performing extraction processing on the target convolution calculation result according to the movement step length of the second convolution kernel, to obtain the dilation convolution calculation result of the input image data, comprises:

extracting a (n×k)-th row of data and a (n×k)-th column of data from the target convolution calculation result, wherein n is the movement step length of the second convolution kernel, n is an integer greater than or equal to two, and k is an integer greater than or equal to zero;

forming the dilation convolution calculation result of the input image data according to data that the (n×k)-th row of data is overlapped with the (n×k)-th column of data; and wherein if a size of the target convolution calculation result is H1×W1, n×k is less than or equal to H1, and n×k is less than or equal to W1.

5. A computer apparatus comprising a processor, a memory, a communication interface and one or more programs stored in the memory and comprising instructions performed by the processor to implement steps of the image processing method, the image processing method comprising:

grouping input image data of a dilation convolution to obtain Dh×Dw grouped image data; wherein Dh is a dilation rate of a convolution kernel corresponding to the dilation convolution on a height dimension thereof, Dw is a dilation rate of a convolution kernel corresponding to the dilation convolution on a width dimension thereof, and both Dh and Dw are positive integers; wherein the step of grouping input image data of a dilation convolution to obtain $D_h \times D_w$ grouped image data, comprises:

filling the input image data to obtain first image data, according to configuration parameters of the dilation convolution;

determining a size of each of the grouped image data according to a size of the first image data;

performing dilation processing on the first image data to obtain second image data, according $D_h$, $D_w$ and the size of each of the grouped image data, wherein the step of performing dilation processing on the first image data to obtain second image data, according to Dh, Dw and the size of each of the grouped image data, comprises:

determining a size of the second image data according to Dh, Dw and the size of each of the grouped image data; and performing the dilation processing that padding Ph rows of zeros after an (H'−1)-th row of the first image data, and performing the dilation processing that padding Pw columns of zeros after a (W'−1)-th column of the first image data, to obtain the second image data; wherein the size of the first image data is H'×W', the size of the second image data is H"×W", Ph=H"−H', and Pw=W"−W'; and grouping the second image data to obtain the $D_h \times D_w$ grouped image data;

performing a convolution calculation on the Dh×Dw grouped image data, respectively, by a first convolution kernel, to obtain Dh×Dw grouped convolution calculation results; wherein the first convolution kernel is a convolution kernel of a convolution before the dilation convolution is dilated; and obtaining a dilation convolution calculation result of the input image data according to the Dh×Dw grouped convolution calculation results.

* * * * *